United States Patent [19]

Kanel et al.

[11] Patent Number: 5,932,101
[45] Date of Patent: Aug. 3, 1999

[54] PROCESS FOR FLUID/DENSE GAS EXTRACTION UNDER ENHANCED SOLUBILITY CONDITIONS

[75] Inventors: Jeffrey Scott Kanel, Kingsport, Tenn.; Rodger Thomas Marentis, Macungie, Pa.

[73] Assignee: Eastman Chemical Company, Kingsport, Tenn.

[21] Appl. No.: 08/911,574

[22] Filed: Aug. 14, 1997

Related U.S. Application Data

[60] Provisional application No. 60/024,823, Aug. 29, 1996.

[51] Int. Cl.$^6$ ............................ B01D 11/00; B01D 15/08
[52] U.S. Cl. ......................... 210/634; 210/639; 210/656; 426/425; 426/429
[58] Field of Search ................................. 210/634, 638, 210/639, 642, 643, 656; 426/425, 429; 203/19

[56] References Cited

U.S. PATENT DOCUMENTS

| | | | |
|---|---|---|---|
| 2,420,185 | 5/1947 | Messmore . | |
| 3,477,856 | 11/1969 | Schultz | 99/105 |
| 3,969,196 | 7/1976 | Zosel . | |
| 4,246,291 | 1/1981 | Prasad et al. . | |
| 4,250,331 | 2/1981 | Shimshick . | |
| 4,253,948 | 3/1981 | Hardman et al. . | |
| 4,345,976 | 8/1982 | Peter et al. | 203/49 |
| 4,349,415 | 9/1982 | DeFillippi et al. | 203/14 |
| 4,400,559 | 8/1983 | Bhise . | |
| 4,437,938 | 3/1984 | Bhise et al. . | |
| 4,466,923 | 8/1984 | Friedrich | 260/412.4 |
| 4,493,854 | 1/1985 | Friedrich et al. | 426/629 |
| 4,495,207 | 1/1985 | Christianson | 426/312 |
| 4,547,292 | 10/1985 | Zarchy | 210/634 |
| 4,568,447 | 2/1986 | Pujado et al. . | |
| 4,749,522 | 6/1988 | Kamarei | 424/101 |
| 4,867,997 | 9/1989 | Wiesenberger et al. . | |
| 4,911,941 | 3/1990 | Katz et al. . | |
| 4,956,052 | 9/1990 | Hirata et al. | 203/19 |
| 4,996,317 | 2/1991 | O'Brien et al. . | |
| 5,011,594 | 4/1991 | Haeffner et al. | 208/320 |
| 5,079,025 | 1/1992 | Zobel et al. | 426/590 |
| 5,116,508 | 5/1992 | Kumar et al. | 210/639 |
| 5,138,075 | 8/1992 | Ohgaki et al. | 549/413 |
| 5,151,188 | 9/1992 | Hopper et al. | 210/634 |
| 5,178,735 | 1/1993 | Manabe et al. | 203/49 |
| 5,185,481 | 2/1993 | Muto et al. | 568/918 |
| 5,284,983 | 2/1994 | Muto et al. | 568/918 |
| 5,490,884 | 2/1996 | Robinson et al. | 95/45 |

FOREIGN PATENT DOCUMENTS

| | | |
|---|---|---|
| 0 259 836 | 3/1988 | European Pat. Off. . |
| 0450378 A2 | 10/1991 | European Pat. Off. . |
| 113325 | 3/1955 | U.S.S.R. . |
| WO94/17789 A1 | 8/1994 | WIPO . |

OTHER PUBLICATIONS

R. J. lahiere et al., "Mass Transfer in Countercurrent Supercritical Extraction", *Separation Science and Technology*, 22(2&3), pp. 379–393 (1987).

J. Arul et al., "Fractionation of Anhydrous Milk Fat by Superficial Carbon Dioxide", *J. Food Science*, vol. 52, No. 5, pp. 1231–1236 (1987).

J. Arul et al., "Distribution of Cholesterol in Milk Fat Fractions", *J. Dairy Research*, 55, pp. 361–371 (1988).

A. R. Bhaskar et al., "Anhydrous Milk Fat Fractionation with Continuous Countercurrent Supercritical Carbon Dioxide", *J. Food Science*, vol. 58, No. 4, pp. 748–752 (1993).

R. L. Bradley, Jr., "Removal of Cholesterol from Milk Fat Using Supercritical Carbon Dioxide", *J. Dairy Science*, 72, pp. 2834–2840 (1989).

G. Brunner et al., Separation of Tocopherols from Deodorizer Condensates by Countercurrent Extraction with Carbon Dioxide, *J. Supercritical Fluids*, 4, pp. 72–80 (1991).

P. J. Carmelo et al., "Modeling of Mass Transfer in Supercritical Countercurrent Extraction Columns: Application to Olive Oils", *Chem. Biochem. Eng.*, Q. 8 (1), pp. 5–9 (1994).

M. Jakobsson et al., "Counter–Current Extraction of Dioxins from Cod Liver Oil by Supercritical Carbon Dioxide", *J. Supercritical Fluids*, 7 (3), pp. 197–200 (1994).

C. T. Lira, "Physical Chemistry of Supercritical Fluids, A Tutorial, SFE and Chromatography", *ACS Series* 366, pp. 1–25 (1988).

R. T. Marentis et al., "Design Considerations for Process Development Units Used for Investigating Commercial Scale–Up of SFE Processes"; Presentation at the 1993 Annual Meeting of the American Institute of Chemical Engineers, St. Louis, MO (1993).

R. T. Marentis et al., "Developing a Commercial–Scale SFE Food Process Utilizing a Process Development Unit", Proceedings of the 3rd International Symposium on Supercritical Fluids (1994).

A. Shishikura et al., "Modification of Butter Oil by Extraction with Supercritical Carbon Dioxide", *Agric. Biol. Chem.*, 50 (5), pp. 1209–1215 (1986).

P. C. Simoes et al., "Mass Transfer in Supercritical Countercurrent Extraction Columns: Application to Natural Oils", *High Pressure and Biotechnology*, Eds. C. Balny, R. Hayashi, K. Heremans and P. Masson. Colioque INSERT/ John Libbey Eurotext Ltd., 224, pp. 457–459 (1992).

Stahl et al., *Dense Gases for Extraction and Refining*, Springer–Verlag, pp. 82–94 (1987).

E. Kruger, "The use of $CO_2$ in the manufacture of hop products" (1980).

*Primary Examiner*—John Kim
*Attorney, Agent, or Firm*—Cheryl J. Tubach; Harry J. Gwinnell

[57] ABSTRACT

A liquid/dense gas extraction column process providing intimate contact between a dense gas and a fluid feed containing a solute and operating in an enhanced solubility region provides solubility of a solute in the dense gas to be at least 250% by weight greater than the solubility of the solute in the dense gas at the same operating temperature and 200 bar pressure. The enhanced solubility region for carbon dioxide is a pressure range of between 450 and 1200 bar in combination with a temperature range between 50 and 300° C. The column has a diameter greater than about 3.5 centimeters and a height to diameter ratio greater than about 5.

32 Claims, No Drawings

PROCESS FOR FLUID/DENSE GAS EXTRACTION UNDER ENHANCED SOLUBILITY CONDITIONS

This application claims the benefit of U.S. Provisional Application Ser. No. 60/024,823 filed Aug. 29, 1996 titled "Supercritical Column Extraction in the Enhanced Solubility Region".

TECHNICAL FIELD

This invention relates to fluid extraction and more particularly to the extraction of solutes utilizing a dense gas under enhanced solubility conditions.

BACKGROUND OF THE INVENTION

For almost twenty years, supercritical fluid extraction (SFE) has been a candidate for many commercial separation applications over conventional separation practices such as solvent extraction, adsorption and distillation. SFE has more favorable mass transfer rates than conventional solvent extraction because of the higher diffusion coefficients of solutes in supercritical fluids and lower viscosities of supercritical fluids. For example, in Lahiere et al., "Mass Transfer in Countercurrent Supercritical Extraction", *Separation Science and Technology*, 22 (2&3) (1987), 379–393, a SFE system of carbon dioxide/ethanol/water at 100 atm. and 30° C. has an extraction efficiency 90% greater than that of the conventional system of toluene/acetone/water at atmospheric pressure and ambient temperature. The major factor for the enhancement in overall extraction efficiency was attributed to the differences in the dispersed phase diffusion coefficients (estimated at 2.1 ($10^{-4}$) cm$^2$/sec for SFE and 2.6 ($10^{-5}$) cm$^2$/sec for conventional solvent extraction). Also, the viscosity of the SFE dispersed phase was an order of magnitude less than for the conventional solvent dispersed phase of toluene/acetone/water.

However, despite these transport property advantages for the SFE system, conventional staged or continuous separation processes are still preferred for most applications. In practice few commercial SFE systems involving multi-stage countercurrent contacting have been designed and erected worldwide. This lack of commercial success is primarily because of higher capital cost associated with SFE equipment. In order to operate at pressures of about 70 to 350 bar, SFE equipment must be large enough to accommodate high supercritical fluid throughput (solvent to feed ratios greater than 20) due to inherent low solubility of solutes in the supercritical fluid. Additionally, there are high costs associated with recompressing large volumes of recycled extraction solvent. Except at very high throughput volumes, typically greater than 25 tons/day of feedstock, the cost of SFE when compared to liquid solvent extraction is higher.

A few supercritical fluid extractions utilizing countercurrent columns are in operation regardless of the economical consideration. These include separating organics from wastewater, ethanol from an aqueous stream, terpenes from citrus peel oils and fatty acid, mono-, di-, and triglycerides from fish oil and milk fat. The major impediment to further commercial exploitation of SFE countercurrent columns has been the industry perception that countercurrent column technology should be utilized for selective fractionations rather than total extractions. Selective fractionations are limited because other fractionation technologies are highly competitive. Total extractions are typically applied to aqueous feedstocks in which organic compounds are separated from a predominately water mixture as opposed to "selective/fractionation extractions" that dominate non-aqueous feedstocks. In a "total extraction" the goal is to extract all of the soluble components, whereas in a "selective extraction" the goal is to extract one or more of the easy to solubilize component(s) from one or more of the difficult to solubilize component(s). Although countercurrent column technology has been applied in a few applications for total extraction, the process economics have been somewhat disappointing due to the low solubility of solutes in supercritical carbon dioxide at the operating temperatures and pressures cited in the prior art. Thus, the majority of technical and commercial developments for SFE has been in selective/fractionation applications wherein columns operate at low pressures of between 70 and 300 bar.

To increase mass transfer flux for SFE systems making them more attractive in commercial separation processes, much research has been conducted to enhance solute solubility by utilizing co-solvents, such as methanol and ethanol, and lower critical pressure hydrocarbon solvents, such as ethane and propane. However, this has also proved to be insufficient to compete with conventional separation process because: (1) co-solvents are difficult to separate from solutes and expensive to recover and (2) hydrocarbons are flammable and explosive. Solubility enhancement by increasing temperature and pressure as another optimizing characteristic has been largely overlooked. If operating conditions existed that markedly improve the solubility of typical organic solutes, such as ethanol in carbon dioxide, then SFE might be a more cost effective industrial processing candidate displacing conventional multi-staged and continuous separation operations.

Supercritical fluids exhibit increases in solvent power for many solutes by several orders of magnitude at higher pressures and temperatures. This region of the phase diagram has been called the "enhanced solubility region". One example of this phenomenon is in the binary system of carbon dioxide/triglycerides. In the state of equilibrium, the concentration of triglycerides in the supercritical carbon dioxide increases significantly in the enhanced solubility region of pressures between 450 and 1200 bar and temperatures between 50 and 300° C. This enhanced solubility of the solute in the supercritical fluid is believed to be a result of the cumulative effects from increased vapor pressure of the solute due to temperature increases and increased density of the supercritical fluid due to pressure increases.

Operation in the enhanced solubility region has heretofore been developed for solid batch extraction systems using supercritical carbon dioxide as the solvent. Applications have focused on natural product processing, such as fat extraction from oil seeds, meats and cocoa, and flavor and antioxidant extraction from herbs and spices. For example, U.S. Pat. No. 4,466,923 discloses a process for extracting a lipid from lipid containing solids, such as vegetable seed, oilseed, cereal seed germ and animal fat, at a temperature in excess of 60° C. and a pressure in excess of 550 bar. U.S. Pat. No. 4,493,854 discloses a process for defatting soybean products by supercritical fluid extraction in the enhanced solubility region of at least 690 bar and 81° C. Prior to extraction, the soybeans are converted to a physical state that is permeable to the carbon dioxide in a solid batch reactor. Typically, the whole bean is prepared by cracking, dehulling, and flaking. The moisture content of the prepared soybeans was noted to be of particular importance in the process and was preferably between 9 to 12 weight percent.

Further commercial exploitation of solid feedstock extraction whether using conventional pressures and temperatures or operating in the enhanced solubility region is impeded by the problems and costs associated with the conveyance of solid feedstock into and out of extraction columns. The solid feedstocks are loaded and unloaded utilizing either quick opening closures that rapidly open the lid of the extraction vessels or lock hopper systems to bring materials under pressure in one or more intermediate stages.

The quick opening closures are expensive to manufacture totaling up to 75% of the vessel cost. Lid seals of the vessels are easily damaged, resulting in high maintenance costs. Additionally, after extraction of each batch, the solvent in the vessel is lost to the atmosphere. In larger systems supercritical carbon dioxide solvent must be collected from the vessel prior to opening with an expensive carbon dioxide recovery system. The quick opening closures are awkward to operate because solids are difficult to handle in large-scale extraction systems requiring specially designed baskets or bags to be filled. In many operations manual labor represents up to 50% of the labor operating costs. To maintain a semi-continuous operation, multiple vessels piped in a complicated series manifold piping design are required. A semi-continuous process is costly, labor intensive and complex to operate. Operating in the enhanced solubility region would further add to the already exorbitant capital costs of the commercial-scale solid feedstock process.

The problems associated with lock hoppers are numerous as well. The solids must be flowable which eliminates many potential applications. Expensive valves and controls are required which can only be justified for very large extraction facilities. The valves are subject to wear and leakage and require significant maintenance. The plant layout dictates that large vessels should be utilized which are expensive to manufacture and to erect on site. Operating in the enhanced solubility range in this system would result in an unwieldy increase in the number of lock hoppers required for a nearly continuous stagewise design.

Another significant problem with solid extractions is the effect of moisture in the feed. The solids must be dried to a moisture level of 6% to 15%, prior to supercritical carbon dioxide extraction. This drying pretreatment step is an expensive process for many applications, especially fermentation broths. U.S. Pat. No. 4,495,207 discloses a process for the production of a food-grade corn germ product from a dry-milled corn germ feed stock by supercritical extraction with carbon dioxide in which the moisture content of the material should be limited to less than about 9% by weight. The '207 patent discloses that beyond this moisture level, extractability is significantly impeded.

While operation of SFE in the enhanced solubility region has been noted in the prior art as an improvement for solid batch extraction systems, almost all large commercial-scale plants operate well below 350 bar because operation in the enhanced solubility region would increase costs significantly. As discussed above, most liquid extraction columns have been designed for selective fractionations operating at lower pressures and temperatures. Liquid extraction using supercritical fluids in the enhanced solubility range has heretofore not been manufactured or developed.

Thus, a need exists in the art to provide for a supercritical fluid extraction process that will significantly lower both capital and operating costs and that will increase throughput volumes required for the economical processing of low-value/high volume commodity applications. Accordingly, it is to the provisions of such improved processes for supercritical fluid extraction that the present invention is primarily directed.

SUMMARY OF THE INVENTION

In a continuous liquid-dense gas extraction process, an extraction solvent and a fluid feed are supplied with a countercurrent flow to an extraction column. The extraction solvent comprises a dense gas. The fluid feed comprises at least one solute and a carrier fluid. The solute is selective to the extraction solvent with respect to the carrier fluid. The carrier fluid comprises at least one component that is barely soluable in the extraction solvent and is substantially immiscible with the extraction solvent so as to provide two phases. The fluid feed and the extraction solvent intimately contact one another in the column a sufficient amount of time to extract the solute from the carrier fluid to the extraction solvent. The column operates in an enhanced solubility region having a pressure of between 450 and 1200 bar and at a temperature between 50 and 300° C. The column has a diameter greater than about 3.5 centimeters and a height to diameter ratio greater than about 5. A raffinate comprising the carrier fluid is removed from the column. An extract comprising the extraction solvent and the solute is removed from the column. The combination of pressure and temperature is sufficient for the solubility of the solute in the extraction solvent to be at least 250% by weight greater than the solubility of the solute in the extraction solvent at the same operating temperature and 200 bar pressure. Additionally, the solute may be separated from the extraction solvent in a phase separation device such as a decanter, a coalescer, a cyclone and a second extraction column.

This invention overcomes the problems of the prior art discussed above by providing to the practitioner of supercritical fluid extraction significant capital and operating cost advantages as a result of the following specific operability improvements. For extraction from liquid feedstocks, the cost of countercurrent carbon dioxide extraction is lowered as compared to near critical or low-pressure and low-temperature countercurrent carbon dioxide extraction by exploiting the substantial increased solute(s) solubility in the supercritical carbon dioxide. The required solvent to feed ratio is lowered, which reduces the column diameter and solvent recycle costs. The mass transfer driving force increases, and thus the mass transfer rates markedly increase reducing the column height. The required extraction time reduces, which lowers the potential for product degradation.

For extraction from solid feedstocks, this invention provides for significant reductions in processing costs, because many applications may now operate in the enhanced solubility region continuously by slurrying the solids with a carrier fluid. Thus, for the same throughput volume of solids, the cost of supercritical fluid extraction processing with this invention will be significantly lower when compared to solid substrate supercritical fluid extraction of the prior art. More efficient solvent loading, as a result of operating in the enhanced solubility region, reduces the solvent to solid mass ratio and thus significantly reduces the amount of solvent recycle. The continuous operation significantly reduces solids handling, and considerably reduces associated labor costs. Expensive drying pretreatment steps are eliminated. High capital cost quick closures are eliminated. Faster processing cycles reduce product degradation. The life of the pressure vessels is extended by eliminating temperature and pressure swings.

DETAILED DESCRIPTION OF THE INVENTION

This invention is a process for extracting a solute(s) from a fluid feed by intimately contacting the fluid feed with a extraction solvent at elevated temperatures and pressures in an enhanced solubility region. The temperatures of operation are between 50 and 300° C., preferably between 80 and 250° C. and the pressures are between 450 and 1200 bar, preferably between above 500 and 1200 bar, and more preferably between above 700 and 1200 bar.

The fluid feed comprises a carrier fluid and at least one solute. The carrier fluid comprises at least one barely soluble component in the extraction solvent and is substantially immiscible with the extraction solvent so as to provide at least two phases. The solute is a material that transfers from the carrier fluid into the extraction solvent. Preferably, the solute(s) almost completely transfer from the fluid feed into the extraction solvent.

The fluid feed must have hydrodynamic characteristics that will allow it to flow through an extraction column. The fluid feed may be in the form of a solution, multiphase liquid dispersion, slurry, or combination thereof. The addition of salts to an aqueous fluid feed has been shown in U.S. Pat. No. 5,116,508 to have a beneficial effect on the extraction of organic compounds with dense gases. An extraction aid having a greater affinity for water than for the solute, such as polyhydric alcohol, propylene glycol, glycerol, or glycol, may also be used to enhance the separation of the solute from the aqueous carrier, as described in U.S. Pat. No. 4,956,052.

Solution fluid feeds include aqueous solutions with oxides, alcohols, citrus oils, pesticides, organic acids, crude oils, aldehydes, ketones, lactones, esters, dyes, carboxylic acids, amino acids, antibiotics, pyrazines, terpenoids, anthraquinones, sesquiterpenes, hydrocarbons, carotenoids, tocopherols, curcumoids, chelated metals, and other soluble extractable components or mixtures thereof. Examples of extractions of process using solution as the fluid feed include decaffineation of liquid coffee and teas and dealcoholization of beers and wines. The fluid feed may also be an azeotropic mixture that is to be separated as discussed in U.S. Pat. No. 4,349,415.

In the form of multiple liquid phases, the fluid feed may be an emulsion, such as aqueous phases in contact with immiscible organic phases. Examples include egg yolks, hydrous milkfat, petroleum and other organics pollutants in sea or fresh water.

The fluid feed may also be in the form of a slurry wherein a solid is dispersed in the aqueous phase. U.S. Pat. Nos. 3,477,856 and 5,178,735 disclose the utility and benefits of forming a slurry prior to extraction. Examples of the dispersed solid phase include algae, fungi, cells from a fermentation or enzyme broth, ground plant matter, ground animal matter, ground mineral matter, ground polymers and plastics, ground seeds, fruit or vegetable pulps, or mixtures thereof. The aqueous or brine slurry must be pumpable, and the solids must be able to flow through the extraction column without accumulating inside the column to the point of causing clogging of the liquid flow through the column.

The extraction process of the present invention is feasible for any solute or mixture of solutes if the selectivities of the solute(s) are favorable to the dense gas with respect to the carrier fluid. The selectivity (S) of a particular solute for the extraction solvent is defined as a distribution coefficient of the solute, Ks, divided by a distribution coefficient of the carrier fluid, Ka. Thus, the equation for selectivity is $$S = K_s/K_a.$$

Ks is defined as a concentration of solute in the extract phase divided by the concentration of solute(s) in the raffinate phase at a specified temperature and pressure. Ka is defined as the concentration of the carrier fluid in the extract phase divided by the concentration of carrier fluid in the raffinate phase of the same specified temperature and pressure. In the case of multiple solutes, each solute will typically have different values for selectivity. For the extraction of a given solute to be successful, the selectivity of that solute for the dense gas must be greater than unity.

The dense gas may be chosen from a variety of gases, but is preferably supercritical carbon dioxide. In addition to being inexpensive and readily available, carbon dioxide is nontoxic, nonflammable, relatively inert and leaves no residue in the extract. Other dense gases include methane, ethane, propane, butane, isobutane, dimethyl ether, sulphur hexaflouride, ammonia, fluorocarbons, and mixtures thereof.

The dense gas may contain one or more co-solvents to improve extractability of the solute(s). Examples include methanol, ethanol, 1-propanol, 2-propanol, 1-hexanol, 2-methoxy ethanol, acetone, tetrahydrofuran, 1,4-dioxane, acetonitrile, dichloromethane, chloroform, dimethyl sulfoxide, formic acid, carbon disulfide, methylene chloride, amines, chelating agents, phase transfer catalysts and combinations thereof. Others examples of dense gases and co-solvents are listed in U.S. Pat. Nos. 4,345,976 and 5,490,884. The co-solvents may also be added to the fluid feed to enhance recovery of the solute in the extraction solvent.

The extraction is conducted in a liquid/dense gas column that is preferably operated in countercurrent mode. For countercurrent contact, the fluid feed is introduced at one end of the column, and at the same time the extraction solvent comprising the dense gas enters the column at the other end. Due to the density differences, the fluid feed and the extraction solvent travel in opposite directions through the column. When the extraction solvent has a lower density than the fluid feed, the extraction solvent is typically supplied to the bottom of the column, the fluid feed is supplied to the top of the column, the extract is removed from the top of the column, and the raffinate is removed from the bottom of the column. Multiple fluid feed or extraction solvent port locations may be also be utilized in the same column. In another embodiment, carrier fluid may be added at one end, the extraction solvent at the other end, and the fluid feed comprising the carrier fluid and solute(s) at some intermediate location. For co-current contact the fluid feed and extraction solvent both enter at the same end of the column and both exit at the opposite end of the column, in which they are intimately contacted to effect solute transfer.

Further, a temperature gradient may be applied along the length of the column to selectively suppress the solubility of one or more solutes in the extraction solvent in order to perform a selective extraction. The temperature gradient is applied by one skilled in the art so one or more of the solutes of interest are extracted by the extraction solvent from the fluid feed as a more concentrated or purified extract. Thus, one or more solutes are largely not extracted by the extraction solvent and exit the column in the raffinate.

The extraction column preferably has an internal diameter greater than 3.5 centimeters, preferably between 5 and 300 centimeters, and more preferably between 5 and 100 centimeters. The column height to diameter ratio is greater than 5, and preferably between 10 and 200. The columns have internal mixing devices to insure that both the fluid feed and extraction solvent are dispersed throughout the column allowing for intimate contact. The columns are either non-agitated or agitated. The non-agitated columns include spray, packed, perforated plate, baffle tray, pulsed packed, pulsed perforated plate, pulsed baffle tray, and any other non-agitated column configurations known in the art. Packed columns may contain random or structured packing or combinations thereof. Random packings that may be used include saddles, rings, other random packings known in the art, or combinations thereof. Structured packings include gauze, mesh, static mixing elements, other structured packings known in the art, or combinations thereof. The internal mixing devices in agitated columns include reciprocating plates, rotating disc, impellers, other agitated devices known in the art or combinations thereof.

The extraction column operates in the enhanced solubility region having a temperature in the range of between 50 and 300° C., preferably between 80 and 250° C., and a pressure in the range of between 450 and 1200 bar, preferably between 500 and 1200 bar, and more preferably between 700 and 1200 bar. For natural-product heat-labile solutes of interest, the preferred temperature range is between 50 and 150° C., and more preferably between 90 and 120° C. For non heat-labile solutes, the preferred temperature range is between 110 and 250° C., and the more a preferred range between 150 and 250° C.

The above mentioned enhanced solubility region particularly relates to supercritical carbon dioxide. The temperature for the enhanced solubility region ranges from 1.5 times to 10 times the critical temperature of carbon dioxide (31.1° C.). The pressure for the enhanced solubility region ranges from 6 times to 16 times the critical pressure of carbon dioxide (73.8 bar). The inventors propose that the enhanced solubility region for each respective dense gas may be determined by applying the multiplication factors for carbon dioxide to the critical temperature and critical pressure of each respective dense gas.

In another embodiment the liquid extraction process, a dense gas which is supplied to the extraction column contains the solute(s) to be extracted rather than the fluid feed. In this situation, a receiving fluid that is barely soluable in the dense gas is supplied to the extraction column. The solute(s) is selective to the receiving fluid with respect to the dense gas. After a sufficient amount of time in the extraction column operating in the enhanced solubility region, an extract comprising the receiving fluid and the solute is removed and a raffinate comprising the dense gas is removed. The selectivity (S) of a particular solute for the receiving fluid is defined as a distribution coefficient of the solute, Ks, divided by a distribution coefficient of the dense gas, Ka. Thus, the equation for selectivity is $$S = Ks/Ka.$$

Ks is defined as a concentration of solute in the extract phase divided by the concentration of solute(s) in the raffinate phase at a specified temperature and pressure. Ka is defined as the concentration of the dense gas in the extract phase divided by the concentration of dense gas in the raffinate phase at the same specified temperature and pressure. Furthermore, this embodiment may be combined with that described above such that two extractions are being conducted simultaneously.

In a preferred embodiment, supercritical carbon dioxide is used to extract a solute from an aqueous carrier fluid in a countercurrent column operating at a temperature between 80 and 250° C. and a pressure between 600 and 850 bar. The extraction efficiency of the solute into the carbon dioxide unexpectedly increases in a controlled fashion from a factor of about 2.5 to as much as a factor of 160 or greater. These results are in direct contrast to the prior art for supercritical fluid countercurrent column extraction processes.

In the additional step of separating the solute(s) from the extraction solvent, the solute-laden extraction solvent exits the column to one or more separation devices. In the separation device, such as a decanter, a coalescer, a cyclone, a second extraction column or combinations thereof, the solute is separated from the extraction solvent. Preferably the separation occurs isobarically. If a second extraction column is used for separation it preferably operates at a lower temperature relative to the first extraction column. If desired, the extraction solvent may be recovered from the separation device and directed to a recycle system for pressure and temperature adjustment prior to reintroduction into the column. Additionally, the raffinate, extract, or both may be refluxed to the column, as is commonly practiced in analogous distillation and extraction processes.

The process provided by the present invention is further illustrated by the following examples which are intended to be exemplary of the invention.

EXAMPLES

For Examples/Comparative Examples 1a to 9b, a supercritical fluid extaction (SFE) unit is used to perform the extraction. SFE Grade carbon dioxide from a cylinder is pumped into a temperature-controlled oven containing a 10 milliliter (ml) pretreatment vessel and a 50 ml cylindrical extraction vessel in series. The carbon dioxide first passes through the 10 ml pretreatment vessel, packed with glass wool wetted with water, to provide sufficient residence time in the oven for the carbon dioxide to reach the set point temperature and to pre-saturate the carbon dioxide with water. Next, the carbon dioxide passes up through the extraction vessel where it contacts the fluid feed containing a solute(s). The extraction vessel consists of a port at the bottom of the vessel through which the carbon dioxide enters the vessel, a fine metal frit to disperse the carbon dioxide and support a liquid charge, a 50 ml open volume for the fluid feed to be extracted, a fine metal frit at the top of the extraction vessel to minimize entrainment of the liquid sample in the exiting carbon dioxide, and a port at the top of the vessel through which the carbon dioxide exits the vessel. A ½ inch thick pad of glass wool is placed above and below the fluid feed to be extracted. After passing through the extractor, the supercritical carbon dioxide and solute(s) is/are expanded through a heated needle valve into a glass extract-sample bottle where the solute(s) is/are collected. The now gaseous carbon dioxide exits the glass extract-sample bottle, is directed through a gas flowmeter, and finally exits the system.

The experimental procedure for Examples 1a to 9b consists of the following steps:

1) placing a glass wool plug at the bottom of the 50 ml extractor,
2) charging the extractor with feed material,
3) placing a second glass wool plug atop the feed material,
4) sealing the extractor by finger tightening the top closure,
5) placing the extractor in the temperature-controlled oven,
6) pressure test the system,
7) heating the oven to the desired setpoint temperature,
8) pressurizing the extractor with carbon dioxide to the setpoint pressure,
9) holding the system at the setpoint temperature and pressure for a period of 5 minutes of static extraction,
10) commencing flow of the carbon dioxide through the extractor at a rate of 3 liters/minute by opening the needle valve,
11) collecting the first dynamic extract sample in a glass collection bottle for a period of five minutes (after carbon dioxide dynamic flow is started), 12) collecting the second, third, and forth dynamic extract samples consecutively for five minute periods in separate glass collection bottles, 13) stopping the flow of carbon dioxide after all of the extract samples have been collected, 14) depressurizing the system, and 15) allowing the extractor to cool, collecting a raffinate sample, and cleaning the extractor.

For Examples/Comparative Examples 10 to 17, a supercritical extraction column with an inside diameter of 38 millimeters and a packed height of 1.6 meters is used to perform the countercurrent extractions. The jacketed column comprises a drain for the heavy phase at the base of the column; a distributor for the light phase 200 millimeters from the base of the column; a support plate immediately above the distributor; ¼ inch 316 stainless steel Raschig rings that were randomly dumped into a single continuous bed; a tube directly above the top of the packed bed through which the heavy phase is charged to the column; a disengagement zone that is 200 millimeters in length; and an exit port in the top headplate for the light phase. Sapphire windows are located at several locations along the length of the column so that the hydrodynamics of the dispersion may be observed as it flows through the packing.

The experimental procedure for Examples 10 to 17 is as follows. The heavy phase of an aqueous fluid feed is held in an agitated tank and charged to the countercurrent column by a pump. Before entering the column, the heavy phase is passed through a heat exchanger to bring the stream to the set-point temperature of the extraction. The heavy phase is intimately contacted in countercurrent flow with the light phase of supercritical carbon dioxide while passing through the column. The heavy phase exits the base of the column through a mass flowmeter and a needle valve into a collection vessel. The light phase enters the column via the distributor at the base of the packing and intimately contacts the heavy phase while passing through the packing. The carbon dioxide, that extracts the solute, is separated from the heavy phase in the top disengagement zone before it overflows the column. This overflow passes through a pressure regulator valve and into a 1.9 liter conical jacketed separator with a bottom drain valve. At least three phases are in equilibrium in the separator: an aqueous phase, a liquid carbon dioxide phase which contained the extracted solute, and a carbon dioxide vapor phase. Sapphire windows in the separator allow for visual interface control of these phases. The carbon dioxide vapor phase then passes through a heat exchanger to liquify the vapor, a pump, a second heat exchanger to reheat the carbon dioxide, and a mass flowmeter before recycling into the extractor.

Example 1a

Natural Carotenoid Extraction from Brine 33.7346 grams of an aqueous brine slurry containing algae Dunaliella salina is charged to the 50 ml extraction vessel. The brine contains sodium chloride, magnesium, potassium, and sulfate ions. The algae Dunaliella salina contains a mixture of natural carotenoids that include α-carotene, trans-β-carotene, cis-β-carotene, β-cryptoxanthin, lutein, and zeaxanthin at the concentrations of 150.6, 322.9, 38.2, 0.75, 3,23, and 1.63 ppm, respectively, and 517 ppm of total carotenoids. The extraction is performed at 635 bar (9200 psig) and 100° C. The percent of total carotenoids in the extraction vessel extracted within 5, 10 and 15 minutes is 25%, 30% and 47%, respectively. This represents an extraction efficiency rate increase of a factor of >39 when compared to conventional extraction pressure conditions of Comparative Example 1b. These results are summarized in Table 1.

Comparative Example 1b

Natural Carotenoid Extraction from Brine 44.5715 grams of an aqueous brine slurry containing the algae Dunaliella salina is charged to the extraction vessel. The brine is saturated with sodium chloride and contains magnesium, potassium, and sulfate ions. The algae Dunaliella salina contains a mixture of natural carotenoids that include α-carotene, trans-β-carotene, cis-β-carotene, β-cryptoxanthin, lutein, and zeaxanthin at the concentrations of 55.2, 154.7, 11.6, 0.63, 1.52, and 0.84 ppm, respectively, and 221 ppm of total carotenoids. The extraction is performed at 373 bar (5400 psig) to 442 bar (6400 psig) and 100° C. The percent of the total carotenoids in the extraction vessel extracted within 5, 10 and 15 minutes is 2%, 2%, and 1.2%, respectively. These results are summarized in Table 1.

Example 2a

Natural Carotenoid Extraction from Carrot Juice 34.279 grams of 100% pure carrot juice is charged to the extraction vessel. The carrot juice contains 59.2, 28.5, 0.9, and 15.8 ppm of α-carotene, trans-β-carotene, cis-β-carotene, and lutein, respectively, and 104.4 ppm of total carotenoids. The extraction is performed at 679 bar (9840 psig) and 100° C. Within 15 minutes, 5.32% of total carotenoids in the extractor vessel are extracted. Note that these solutes are not extracted at the conventional extraction conditions of Comparative Example 2b. These results are summarized in Table 1.

Comparative Example 2b

Natural Carotenoid Extraction from Carrot Juice 35.539 grams of 100% pure carrot juice is charged to the extraction vessel. The carrot juice contains 65.1, 31.5, 0.9, and 20.58 ppm of α-carotene, trans-β-carotene, cis-β-carotene, and lutein, respectively, and 118.08 ppm of total carotenoids. The extraction is performed at 284 bar (4100 psig) and 61° C. Within fifteen minutes, 0.00% of the total carotenoids in the extractor vessel are extracted. These results are summarized in Table 1.

Example 3a

Lycopene Extraction from Tomato Skins 7.364 grams of dried tomato skins and seeds are suspended in 35.028 grams of HPLC grade water and charged to the extraction vessel. The slurry contains 5.29, 1.00, 20.59, and 24.12 ppm, of trans-β-carotene, cis-βcarotene, lycopene, and lycopene isomers, respectively, and 51.18 ppm of total carotenoids. The extraction is performed at 666 bar (9650 psig) and 99° C. Within fifteen minutes, 0.20% of the lycopene in the extraction vessel is extracted. This represents an extraction efficiency rate increase of a factor of >2.8 when compared to conventional extraction conditions of Comparative Example 3b. These results are summarized in Table 1.

Comparative Example 3b

Lycopene Extraction from Tomato Skins 7.364 grams of dried tomato skins and seeds are suspended in 35.028 grams of HPLC grade water and charged to the extraction vessel. The slurry contains 5.3, 1.0, 20.6, and 24.1 ppm, of trans-β-carotene, cis-β-carotene, lycopene, and lycopene isomers, respectively, and 51.18 ppm of total carotenoids. The extraction is performed at 316 bar (4570 psig) and 51° C. Within 15 minutes, 0.07% of the lycopene in the extraction vessel is extracted. These results are summarized in Table 1.

Example 4a

Tocopherol Extraction from Water 2.014 grams of Vitamin E are dispersed in 36.547 grams of HPLC grade water and charged to the extraction vessel. The liquid-liquid dispersion contains 3789, 6659, and 13650 ppm of α-tocopherol, δ-tocopherol, and γ-tocopherol, respectively. The extraction is performed at 670 bar (9700 psig) and 92° C. Within 15 minutes, 89.69% of the α-tocopherol in the extraction vessel is extracted. This represents an extraction efficiency rate increase of a factor of >4.4 when compared to conventional extraction conditions of Comparative Example 4b. These results are summarized in Table 1.

Comparative Example 4b

Tocopherol Extraction from Water 2.021 grams of Vitamin E are dispersed in 37.925 grams of HPLC grade water and charged to the extraction vessel. The liquid-liquid dispersion contains 3866, 6795, and 13920 ppm of α-tocopherol, δ-tocopherol, and γ-tocopherol, respectively. The extraction is performed at 309 bar (4470 psig) and 51° C. Within 15 minutes, 20.14% of the α-tocopherol in the extraction vessel is extracted. These results are summarized in Table 1.

Example 5a

Triglyceride Extraction from Soybeans 9.312 grams of dry ground soybean are mixed with 22.864 grams of HPLC grade water and charged to the extraction vessel. The slurry contains 67510 ppm triglycerides. The extraction is performed at 668 bar (9670 psig) and 100° C. Within 15 minutes, 0.07% of the triglycerides in the extraction vessel are extracted. Note that these solutes are not extracted at the conventional extraction conditions of Comparative Example 5b. These results are summarized in Table 1.

Comparative Example 5b

Triglyceride Extraction from Soybeans 7.069 grams of dry ground soybean are mixed with 25.278 grams of HPLC grade water and charged to the extraction vessel. The slurry contains 50980 ppm triglycerides. The extraction is performed at 315 bar (4550 psig) and 50° C. Within 15 minutes, 0.00% of the triglycerides in the extraction vessel are extracted. These results are summarized in Table 1.

Example 6a

Piperine Extraction from Black Pepper 11.092 grams of pure ground black pepper is mixed with 30.483 grams of HPLC grade water and charged to the extraction vessel. The slurry contains 50900 ppm piperine. The extraction is performed at 681 bar (9680 psig) and 100° C. Within 15 minutes, 7.00% of the piperine in the extraction vessel is extracted. This represents an extraction efficiency rate increase of a factor of 10.66 when compared to the conventional extraction conditions of Comparative Example 4b. These results are summarized in Table 1.

Comparative Example 6b

Piperine Extraction from Black Pepper 11.196 grams of pure ground black pepper is mixed with 29.094 grams of HPLC grade water and charged to the extraction vessel. The slurry contains 50900 ppm piperine. The extraction is performed at 280 bar (4040 psig) and 60° C. Within 15 minutes, 0.66% of the piperine in the extraction vessel is extracted. These results are summarized in Table 1.

Example 7a

Butanol Extraction from Water 37.846 grams of a 5 weight percent 1-butanol in deionized water solution is charged to the extraction vessel. The extraction is performed at 666 bar (9640 psig) and 101° C. Within fifteen minutes, 81.17% of the butanol in the extraction vessel is extracted. This represents an extraction efficiency rate increase of a factor of 2.5 when compared to the conventional extraction conditions of Comparative Example 7b. These results are summarized in Table 1. The apparatus is slightly modified from that described above for this experiment, as a dry ice trap is installed on the vapor line exiting the glass extract-sample bottle to trap any 1-butanol that is not collected in the glass extract-sample bottle.

Comparative Example 7b

Butanol Extraction from Water 38.11 grams of a 5 weight percent 1-butanol in deionized water solution is charged to the extraction vessel. The extraction is performed at 205 bar (2960 psig) and 51° C. Within fifteen minutes, 32.93% of the butanol in the extraction vessel is extracted. These results are summarized in Table 1. The apparatus is slightly modified from that described above for this experiment, as a dry ice trap is installed on the vapor line exiting the glass extract-sample bottle to trap any 1-butanol that is not collected in the glass extract-sample bottle.

Example 8a

Ethanol Extraction from Water 37.154 grams of a 5 weight percent ethanol in deionized water solution is charged to the extraction vessel. The extraction is performed at 661 bar (9570 psig) and 100° C. Within fifteen minutes, 10.25% of the ethanol in the extraction vessel is extracted. This solute is not extracted at the conventional extraction conditions of Comparative Example 8b. These results are summarized in Table 1. The apparatus is slightly modified from that described above for this experiment, as a dry ice trap is installed on the vapor line exiting the glass extract-sample bottle to trap any ethanol that is not collected in the glass extract-sample bottle.

Comparative Example 8b

Ethanol Extraction from Water 38.794 grams of a 5 weight percent ethanol in deionized water solution is charged to the extraction vessel. The extraction is performed at 205 bar (2960 psig) and 52° C. Within 15 minutes, 0.00% of the ethanol in the extraction vessel is extracted. These results are summarized in Table 1. The apparatus is slightly modified from that described above for this experiment, as a dry-ice trap is installed on the vapor line exiting the glass extract-sample bottle to trap any ethanol that is not collected in the glass extract-sample bottle.

Example 9a

Ethanol Extraction from Water 38.469 grams of a 10.206 weight percent ethanol in deionized water solution is charged to the extraction vessel. The extraction is performed at 677 bar (9800 psig) and 90° C. Within 15 minutes, 12.43% of the ethanol in the extraction vessel is extracted. This represents an extraction efficiency rate increase of a factor of 44 when compared to the conventional extraction conditions of Comparative Example 9b. These results are summarized in Table 1. The apparatus is modified from that previously described above for this experiment, as the extract is discharged beneath the surface of chilled o-xylene that fills the bottom half of the glass extract-sample bottle. This modification is made to trap the ethanol in the extract sample.

Comparative Example 9b

Ethanol Extraction from Water 33.304 grams of a 10.206 weight percent ethanol in deionized water solution is charged to the extraction vessel. The extraction is performed at 201 bar (2900 psig) and 50° C. Within 15 minutes, 0.28% of the ethanol in the extraction vessel is extracted. These results are summarized in Table 1. The apparatus is modified from that previously described above for this experiment, as the extract is discharged beneath the surface of chilled o-xylene that fills the bottom half of the glass extract-sample bottle. This modification is made to trap the ethanol in the extract sample.

TABLE 1

| Ex. | Carrier Fluid | Solute | Press (bar) | Temp (° C.) | % Solute Extracted in 15 min. |
|---|---|---|---|---|---|
| 1a | Brine | Carotenoids | 635 | 100 | 46.55 |
| 1b | Brine | Carotenoids | 373–442 | 100 | 1.19 |
| 2a | Carrot Juice | Carotenoids | 679 | 100 | 5.32 |
| 2b | Carrot Juice | Carotenoids | 284 | 61 | 0.00 |
| 3a | Tomato skins and Water | Lycopene | 666 | 99 | 0.20 |
| 3b | Tomato skins and Water | Lycopene | 316 | 51 | 0.07 |
| 4a | Water | α-Tocopherol | 670 | 92 | 89.69 |
| 4b | Water | α-Tocopherol | 309 | 51 | 20.14 |
| 5a | Soybeans and Water | Triglycerides | 668 | 100 | 0.07 |
| 5b | Soybeans and Water | Triglycerides | 315 | 50 | 0.00 |
| 6a | Black Pepper and Water | Piperine | 681 | 100 | 7.00 |
| 6b | Black Pepper and Water | Piperine | 280 | 60 | 0.66 |
| 7a | Water | Butanol | 666 | 101 | 81.17 |
| 7b | Water | Butanol | 205 | 51 | 32.93 |
| 8a | Water | Ethanol | 661 | 100 | 10.25 |
| 8b | Water | Ethanol | 205 | 52 | 0.00 |
| 9a | Water | Ethanol | 677 | 90 | 12.43 |
| 9b | Water | Ethanol | 201 | 50 | 0.28 |

Example 10

Carotenoid Extraction from Brine 1904 grams of dark red brine that contains microalgae *Dunaliella salina* with a total carotenoid (solute) concentration of about 100 ppm is fed to the top of a countercurrent extraction column over the period of 90 minutes. A total of 9.2 kilograms of carbon dioxide (extraction solvent) is fed to the bottom of the extraction column over this same period of time. The extraction solvent to fluid feed mass ratio is held constant throughout the run at 4.8. The countercurrent extraction is performed at 420 bar and 110° C. operating steadily throughout the period. The raffinate is drained periodically throughout the run and is only slightly yellow-orange in color. The extract is depressurized into the separator, which is held at 24° C. and 56 bar throughout the course of the run. In the separator, a clear vapor phase and slightly yellow aqueous phase are in equilibrium with a very dark red liquid carbon dioxide phase. The packing is visually inspected throughout the run, but no accumulated solids or carotenoids are observed to adhere to the packing. Upon completion of the run, the separator contents are first depressurized, then drained into a round bottom flask. The separator is carefully rinsed with heptane, which is combined with the drained material. The water and heptane are evaporated, and the remaining 0.294 grams of solids are analyzed for α-carotene, β-carotene, and cis-β-carotene by high pressure gas chromatography (HPLC). The resulting relative concentrations of these components in the extract solids are 27.7%, 53.4%, and 18.9%, respectively. Analyses of two raffinate samples via HPLC fails to detect any carotenoids. Therefore, essentially all of the carotenoids charged to the extractor in the feed are extracted into the carbon dioxide phase. The overall mass balance for the system closes to within 5%.

Example 11

Carotenoid Extraction from Brine 2785.5 grams of dark red brine that contains the microalgae *Dunaliella salina* with a total carotenoid (solute) concentration of about 67 ppm is fed to the top of the countercurrent extraction column over the period of 130 minutes. A total of 15.1 kilograms of carbon dioxide (extraction solvent) is fed to the bottom of the extraction column over this same period of time. The extraction solvent to fluid feed mass ratio is held constant throughout the run at 5.42. The countercurrent extraction is performed at 200 bar and 110° C. operating steadily throughout the period. The raffinate is drained periodically throughout the run and is orange-red in color. The extract is depressurized into the separator, which is held at 33.50° C. and 62.5 bar throughout the course of the run. In the separator, a clear vapor phase and slightly yellow aqueous phase are in equilibrium with a very dark red liquid carbon dioxide phase. The packing is visually inspected throughout the run, but no accumulated solids or carotenoids are observed to adhere to the packing. Upon completion of the run, the separator contents are first depressurized, then drained into a round bottom flask. The separator is carefully rinsed with heptane, which is combined with the drained material. The water and heptane are evaporated, and the remaining 0.2047 grams of solids are analyzed for α-carotene, β-carotene, and cis-β-carotene by high pressure gas chromatography (HPLC). The resulting relative concentrations of these components in the extract solids are 30.0%, 48.1%, and 21.9%, respectively. Analyses of two raffinate samples via HPLC detect an average of 3.1 ppm total carotenoids. Therefore, even at a higher solvent to fluid feed ratio the fractional extraction of the total carotenoids is only 0.955. The overall mass balance for the system closes to within 11%.

Example 12

Carotenoid Extraction from Brine 1898.6 grams of dark red brine that contains the microalgae *Dunaliella salina* with a total carotenoid (solute) concentration of about 86.3 ppm is fed to the top of the countercurrent extraction column over the period of 90 minutes. A total of 9.6 kilograms of carbon dioxide (extraction solvent) is fed to the bottom of the extraction column over this same period of time. The extraction solvent to fluid feed mass ratio is held constant throughout the run at 5.06. The countercurrent extraction is performed at 420 bar and 40° C. operating steadily throughout the period. The raffinate is drained periodically throughout the run and is orange in color. The extract is depressurized into the separator throughout the course of the run. In the separator, a clear vapor phase and slightly yellow aqueous phase are in equilibrium with a very dark red liquid carbon dioxide phase. The packing is visually inspected throughout the run, but no accumulated solids or carotenoids are observed to adhere to the packing. Upon completion of the run, the separator contents are first depressurized, then drained into a round bottom flask. The separator is carefully rinsed with heptane, which is combined with the drained material. The water and heptane are evaporated, and the remaining 0.4877 grams of solids are analyzed for α-carotene, β-carotene, and cis-β-carotene by high pressure gas chromatography (HPLC). The resulting relative concentrations of these components in the extract solids are 29.6%, 48.5%, and 21.9%, respectively. Analyses of two raffinate samples via HPLC detect an average of 7.8 ppm total carotenoids. Therefore, the fractional extraction of the total carotenoids is 0.91. The overall mass balance for the system closes to within 1%.

Example 13

Carotenoid Extraction from Brine 2000 grams of dark red brine that contains the microalgae *Dunaliella salina* with a total carotenoid (solute) concentration of 100 ppm is fed to the top of the countercurrent extraction column over the period of 90 minutes. A total of 4 kilograms of carbon dioxide (extraction solvent) is fed to the bottom of the extraction column over this same period of time. The extraction solvent to fluid feed mass ratio is held constant throughout the run at 2. The countercurrent extraction is performed at 700 bar and 110° C. operating steadily throughout the period. The raffinate is drained periodically throughout the run and is only slightly yellow-orange in color. The extract is depressurized into the separator, which is held at 25° C. and 56 bar throughout the course of the run. In the separator, a clear vapor phase and slightly yellow aqueous phase are in equilibrium with a very dark red liquid carbon dioxide phase. The packing is visually inspected throughout the run, but no accumulated solids or carotenoids are observed to adhere to the packing. Upon completion of the run, the separator contents are first depressurized, then drained into a round bottom flask. The separator is carefully rinsed with heptane, which is combined with the drained material. The water and heptane are evaporated, and the remaining 0.3 grams of solids are analyzed for α-carotene, β-carotene, and cis-β-carotene by high pressure gas chromatography (HPLC). The resulting relative concentrations of these components in the extract solids are about 30%, 50%, and 20%, respectively. Analyses of the raffinate sample via HPLC fails to detect any carotenoids. Therefore, essentially all of the carotenoids charged to the extractor in the feed are extracted into the carbon dioxide phase. The overall mass balance for the system closes to within 5%.

Example 14

Ethanol and Vitamin E Extraction from Water 1581.7 grams of an aqueous solution that contains 4.3 weight percent ethanol and 0.02 weight percent of vitamin E is fed to the top of the countercurrent extraction column over the period of 90 minutes. A total of 9.9 kilograms of carbon dioxide (extraction solvent) is fed to the bottom of the extraction column over this same period of time. The extraction solvent to fluid feed mass ratio is held constant throughout the run at 6.26. The countercurrent extraction is performed at 420 bar and 110° C. operating steadily throughout the period. The raffinate is drained periodically throughout the run and is clear. The extract is depressurized into the separator, which is held at 23° C. and 52.5 bar throughout the course of the run. The packing is visually inspected throughout the run, and materials are not observed to adhere to the packing. Upon completion of the run, the separator contents are first depressurized, then drained into a flask. The extract is analyzed by gas chromatography for ethanol and by high pressure gas chromatography (HPLC) for vitamin E. The extract contains 13.8 weight percent ethanol and 6 ppm of vitamin E. Analyses of the raffinate shows 0.75 weight percent ethanol and no detectable vitamin E. Therefore, the fractional extraction of ethanol is 0.84 and essentially unity for vitamin E. The overall mass balance for the system closed to within 6%.

Example 15

Ethanol and Vitamin E Extraction from Water 1640.0 grams of an aqueous solution that contains 3.71 weight percent ethanol and 0.005 weight percent of vitamin E is fed to the top of the countercurrent extraction column over the period of 90 minutes. A total of 9.6 kilograms of carbon dioxide (extraction solvent) is fed to the bottom of the extraction column over this same period of time. The extraction solvent to fluid feed mass ratio is held constant throughout the run at 5.85. The countercurrent extraction is performed at 200 bar and 110° C. operating steadily throughout the period. The raffinate is drained periodically throughout the run and is slightly orange due to traces of residual carotenoids. The extract is depressurized into the separator, which is held at 25° C. and 58 bar throughout the course of the run. The packing is visually inspected throughout the run, and solids are not observed to adhere to the packing. Upon completion of the run, the separator contents are first depressurized, then drained into a flask. The extract is analyzed by gas chromatography for ethanol and by high pressure gas chromatography (HPLC) for vitamin E. The extract contains 27.33 weight percent ethanol and no vitamin E. Analyses of the raffinate shows 1.16 weight percent ethanol and no detectable vitamin E. Therefore, the fractional extraction of ethanol is 0.69 and essentially unity for vitamin E. The overall mass balance for the system closes to within 5%.

Example 16

Ethanol and Vitamin E Extraction from Water 1555.5 grams of an aqueous solution that contains 4.31 weight percent ethanol and 0.02 weight percent of vitamin E is fed to the top of the countercurrent extraction column over the period of 90 minutes. A total of 8.7 kilograms of carbon dioxide solvent is fed to the bottom of the extraction column over this same period of time. The solvent to feed mass ratio is held constant throughout the run at 5.59. The countercurrent extraction is performed at 420 bar and 40° C. operating steadily throughout the period. The raffinate is drained periodically throughout the run and is slightly red-orange due to traces of residual carotenoids that contaminate the column. The extract is depressurized into the separator, which is held at 36° C. and 54 bar throughout the course of the run. The packing is visually inspected throughout the run, and water is held up at the top of the extraction column. A significant amount of water is entrained into the separator. This flooding results from the low density difference between the aqueous ethanol feed and the carbon dioxide at these conditions. Therefore, the flooded condition of the column should be recognized when the data are compared to the other examples. Upon completion of the run, the separator contents are first depressurized, then drained into a flask. The extract is analyzed by gas chromatography for ethanol and by high pressure gas chromatography (HPLC) for vitamin E. The extract contains 6.2 weight percent ethanol. Analyses of the raffinate shows 1.74 weight percent ethanol and no detectable vitamin E. Therefore, the fractional extraction of ethanol is 0.60 and essentially unity for vitamin E. The overall mass balance for the system closes to within 3%.

Example 17

Ethanol and Vitamin E Extraction from Water 1500 grams of an aqueous solution containing 4 weight percent ethanol and 0.02 weight percent of vitamin E is fed to the top of the countercurrent extraction column over the period of 90 minutes. A total of 4.5 kilograms of carbon dioxide (extraction solvent) is fed to the bottom of the extraction column over this same period of time. The extraction solvent to fluid feed mass ratio is held constant throughout the run at 3. The countercurrent extraction is performed at 700 bar and 110° C. operating steadily throughout the period. The raffinate is drained periodically throughout the run and is clear. The extract is depressurized into the separator, which is held at about 25° C. and 50 bar throughout the course of the run. Upon completion of the run, the separator contents are first depressurized, then drained into a flask. The extract is analyzed by gas chromatography for ethanol and for vitamin E. Analyses of the raffinate shows about 0.75 weight percent ethanol and no detectable vitamin E. Therefore, the fractional extraction of ethanol is about 0.85 and essentially unity for vitamin E. The overall mass balance for the system closes to within about 10%.

The invention has been described in detail with particular reference to preferred processes thereof, but it will be understood that variations and modifications can be effected within the spirit and scope of the invention.

We claim:

1. A continuous liquid-dense gas extraction process comprising the steps of:
   a. supplying an extraction solvent comprising a dense gas to an extraction column, wherein the extraction column has a diameter greater than about 3.5 centimeters and a height to diameter ratio greater than about 5 and operates in an enhanced solubility region having a pressure of between 450 and 1200 bar and at a temperature between 50 and 300° C.;
   b. supplying a fluid feed comprising at least one solute and a carrier fluid to the extraction column, wherein the fluid feed and the extraction solvent are supplied to the extraction column with a countercurrent flow and are intimately contacting one another a sufficient amount of time to extract the at least one solute from the carrier fluid to the extraction solvent; the carrier fluid comprises at least one component being barely soluable in the extraction solvent and is substantially immiscible with the extraction solvent so as to provide two phases, and the at least one solute is selective to the extraction solvent with respect to the carrier fluid;
   c. removing from the extraction column a raffinate comprising the carrier fluid; and
   d. removing from the extraction column an extract comprising the extraction solvent and the at least one solute;
      whereby the combination of pressure and temperature is sufficient for the solubility of the at least one solute in the extraction solvent to be at least 250% by weight greater than the solubility of the at least one solute in the extraction solvent at the same operating temperature and 200 bar pressure.

2. The process of claim 1 further comprising the step of separating the solute from the extraction solvent.

3. The process of claim 2 wherein the separation occurs isobarically relative to the extraction column.

4. The process of claim 2 wherein the solute is separated from the extraction solvent in a phase separation device selected from the group consisting of a decanter, a coalescer, a cyclone and a second extraction column.

5. The process of claim 4 wherein the second extraction column operates isobarically and at a lower temperature relative to the first extraction column.

6. The process of claim 1 wherein the extraction solvent is supplied to a bottom of the extraction column, the fluid feed is supplied to a top of the extraction column, the extract is removed from the top of the extraction column, and the raffinate is removed from the bottom of the extraction column.

7. The process of claim 1 wherein the extraction column operates at a pressure between above 500 and 1200 bar.

8. The process of claim 7 wherein the extraction column operates at a pressure between above 700 and 1200 bar.

9. The process of claim 1 wherein the extraction column operates at a temperature between 80 and 250° C.

10. The process of claim 1 wherein the extraction column has a diameter between 5 and 300 centimeters and a height to diameter ratio between 10 and 200.

11. The process of claim 10 wherein diameter of the extraction column is between 5 and 100 centimeters.

12. The process of claim 1 wherein the dense gas is supercritical carbon dioxide.

13. The process of claim 1 wherein the fluid feed is a solution, a dispersion, a slurry or combination thereof.

14. The process of claim 1 wherein the carrier fluid substantially comprises water, a polymer or a low-volatility high-molecular weight hydrocarbon.

15. The process of claim 1 wherein the fluid feed is a fermentation broth and the solute is a product of the fermentation broth.

16. The process of claim 15 wherein the product of the fermentation broth is selected from the group consisting of ethanol, carotenoids, tocopherols, tocotrienols, 2-ketogulonic acid, and ascorbic acid.

17. The process of claim 1 wherein the solute is an alkaloid.

18. The process of claim 17 wherein the alkaloid is selected from the group consisting of caffeine, nicotine, theobromine, or combinations thereof.

19. The process of claim 1 wherein the solute is derived from plant matter, animal matter or microorganisms.

20. The process of claim 1 wherein the solute forms an azeotropic mixture with the carrier fluid.

21. The process of claim 1 wherein the selectivity of the solute for the extraction solvent is greater than unity with respect to the carrier fluid.

22. The process of claim 1 wherein the extraction solvent further comprises a co-solvent and the extract further comprises the co-solvent, the solute being selective to the extraction solvent and the co-solvent with respect to the carrier fluid.

23. The process of claim 22 wherein the co-solvent and the solute react with each other.

24. The process of claim 22 wherein the co-solvent is selected from the group consisting of benzene, toluene, xylene, acetonitrile, acetone, methylene chloride, cyclohexane, hexane, n-heptane, methyl cyclohexane, iso-octane, octane, nonane, decane, ethyl acetate, ethanol, methanol, phase transfer catalyst, amines, chelating agents and mixtures thereof.

25. The process of claim 1 wherein the fluid feed further comprises a co-solvent and the extract further comprises the co-solvent, the solute being selective to the co-solvent with respect to the carrier fluid.

26. The process of claim 25 wherein the co-solvent is selected from the group consisting of benzene, toluene, xylene, acetonitrile, acetone, methylene chloride, cyclohexane, hexane, n-heptane, methyl cyclohexane, iso-octane, octane, nonane, decane, ethyl acetate, ethanol, methanol, phase transfer catalyst, amines and chelating agents and mixtures thereof.

27. The process of claim 1 wherein the extraction solvent further comprises a second solute, the second solute being selective to the carrier fluid with respect to the dense gas and the raffinate further comprises the second solute.

28. The process of claim 1 further comprising the step of applying a thermal gradient across the length of the extraction column wherein the extraction of a second solute from the fluid feed to the extraction solvent is suppressed.

29. A continuous extraction process comprising the step of countercurrently and intimately contacting a fluid feed comprising at least one solute and a carrier fluid with supercritical carbon dioxide in an extraction column a sufficient amount of time to extract the at least one solute from the carrier fluid to the supercritical carbon dioxide, wherein the carrier fluid comprises substantially water, the at least one solute is selective to the supercritical carbon dioxide with respect to the carrier fluid, and the extraction column operates in an enhanced solubility region at a pressure of between 600 and 850 bar and at a temperature between 80 and 250° C. and has a diameter greater than about 3.5 centimeters and a height to diameter ratio greater than about 5; whereby the combination of pressure and temperature is sufficient for the solubility of the at least one solute in the supercritical carbon dioxide to be at least 250% by weight greater than the solubility of the at least one solute in the supercritical carbon dioxide at the same operating temperature and 200 bar pressure.

30. The process of claim 29 wherein the separating occurs in a phase separation device selected from the group consisting of a decanter, a coalescer, a cyclone and a second extraction column.

31. The process of claim 29 wherein the extraction column has a diameter between 5 and 300 centimeters and a height to diameter ratio between 10 and 200.

32. The process of claim 29 wherein the diameter of the extraction column is between 5 and 100 centimeters.

* * * * *